United States Patent
Kojima et al.

(10) Patent No.: US 7,990,121 B2
(45) Date of Patent: Aug. 2, 2011

(54) SYNCHRONOUS RECTIFICATION SWITCHING REGULATOR, CONTROL CIRCUIT THEREOF, AND METHOD OF CONTROLLING THE OPERATION THEREOF

(75) Inventors: Shinichi Kojima, Osaka (JP); Tohru Ueno, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 821 days.

(21) Appl. No.: 11/794,702

(22) PCT Filed: Nov. 9, 2006

(86) PCT No.: PCT/JP2006/322799
§ 371 (c)(1),
(2), (4) Date: Jul. 3, 2007

(87) PCT Pub. No.: WO2007/060871
PCT Pub. Date: May 31, 2007

(65) Prior Publication Data
US 2009/0201000 A1    Aug. 13, 2009

(30) Foreign Application Priority Data

Nov. 25, 2005 (JP) ................. 2005-340626
Jul. 19, 2006 (JP) ................. 2006-196772

(51) Int. Cl.
*G05F 1/40* (2006.01)
*G05F 1/56* (2006.01)

(52) U.S. Cl. ......... 323/282; 323/284; 323/285; 323/908

(58) Field of Classification Search ............. 323/282, 323/284, 285, 908
See application file for complete search history.

(56) References Cited

U.S. PATENT DOCUMENTS

| 5,481,178 A | 1/1996 | Wilcox et al. |
| 6,091,232 A | 7/2000 | Criscione et al. |
| 6,275,014 B1 | 8/2001 | Sudo |
| 6,541,947 B1 | 4/2003 | Dittmer et al. |

(Continued)

FOREIGN PATENT DOCUMENTS

JP    7-7928    1/1995

(Continued)

OTHER PUBLICATIONS

Feb. 5, 2009 Korean official action (and English translation thereof) in connection with a counterpart Korean patent application No. 10-2007-7016551.

(Continued)

*Primary Examiner* — Harry Behm
*Assistant Examiner* — Matthew Grubb
(74) *Attorney, Agent, or Firm* — Cooper & Dunham LLP

(57) ABSTRACT

A synchronous-rectification-type switching regulator is disclosed that includes a first switching element; an inductor charged with a voltage input to an input terminal of the switching regulator by the switching of the first switching element; a second switching element for synchronous rectification performing switching so as to discharge the inductor; a control circuit part controlling the switching of the first switching element so that an output voltage from an output terminal of the switching regulator is a predetermined constant voltage, and to cause the second switching element to perform the switching inversely to the first switching element; and a reverse current prevention circuit part interrupting a current that flows into the second switching element by cutting off the connection of the second switching element so as to prevent generation of a reverse current that flows in the direction of the second switching element from the output terminal.

28 Claims, 11 Drawing Sheets

U.S. PATENT DOCUMENTS

| | | | |
|---|---|---|---|
| 6,580,258 B2 | 6/2003 | Wilcox et al. | |
| 6,753,723 B2 | 6/2004 | Zhang | |
| 7,432,688 B2 * | 10/2008 | Liu et al. | 323/224 |
| 2004/0264214 A1 * | 12/2004 | Xu et al. | 363/16 |
| 2005/0258889 A1 * | 11/2005 | Tolle et al. | 327/374 |
| 2006/0164057 A1 * | 7/2006 | Kudo et al. | 323/282 |
| 2007/0013351 A1 * | 1/2007 | Naka et al. | 323/241 |
| 2008/0068868 A1 * | 3/2008 | Williams | 363/21.06 |
| 2008/0259649 A1 * | 10/2008 | Marchand et al. | 363/21.03 |

FOREIGN PATENT DOCUMENTS

| | | |
|---|---|---|
| JP | 2004-56982 | 2/2004 |
| JP | 2005-168173 | 6/2005 |
| JP | 2005-253253 | 9/2005 |

OTHER PUBLICATIONS

Apr. 9, 2010 European search report in connection with counterpart European patent application No. 06 83 2689.

* cited by examiner

SYNCHRONOUS RECTIFICATION SWITCHING REGULATOR, CONTROL CIRCUIT THEREOF, AND METHOD OF CONTROLLING THE OPERATION THEREOF

TECHNICAL FIELD

The present invention relates generally to switching regulators of a synchronous rectification type, and more particularly to a switching regulator of a synchronous rectification type capable of realizing high efficiency in an IC circuit at the time of a light load, a control circuit thereof, and a method of controlling the operation of the switching regulator.

BACKGROUND ART

FIG. 1 is a circuit diagram showing a conventional switching regulator of a synchronous rectification type. (See, for example, Japanese Laid-Open Patent Application No. 2004-56982.)

The switching regulator of FIG. 1 is a step-down synchronous rectification type, in which a current flows backward from an output terminal 104 to ground GND through an NMOS transistor QN1 at a light load time. In order to prevent such current backflow or reverse current from being generated, the switching regulator of FIG. 1 uses a detector circuit 131 to quickly detect a time for the voltage at the connection K of a PMOS transistor QP1 and the NMOS transistor QN1 to increase across the ground voltage GND again after undershooting the ground voltage GND, and immediately turns OFF the NMOS transistor QN1. As a result, generation of reverse current is prevented, so that power consumption is reduced.

However, according to the switching regulator of FIG. 1, when a reverse current is detected in the detector circuit 131, the NMOS transistor QN1 is turned OFF via an output driver 132. Therefore, there is a delay in time between the detection of the reverse current and the turn-off of the NMOS transistor QN1. This causes the reverse current to flow from the output terminal 104 through a coil L for a longer period of time, thus causing the problem of reduced efficiency.

SUMMARY

According to an aspect of this disclosure, there are provided a switching regulator of a synchronous rectification type capable of reducing the delay between detection of generation of reverse current and interruption of the reverse current and improving efficiency, a control circuit thereof, and a method of controlling the operation of the switching regulator.

According to another aspect of this disclosure, there is provided a switching regulator of a synchronous rectification type converting an input voltage input to an input terminal into a predetermined constant voltage and outputting the predetermined constant voltage to a load connected to an output terminal, the switching regulator including: a first switching element configured to perform switching in accordance with a control signal input thereto; an inductor configured to be charged with the input voltage by the switching of the first switching element; a second switching element for synchronous rectification configured to perform switching in accordance with a control signal input thereto so as to discharge the inductor; a control circuit part configured to control the switching of the first switching element so that an output voltage output from the output terminal is the predetermined constant voltage, and to cause the second switching element to perform the switching inversely to the first switching element; and a reverse current prevention circuit part configured to interrupt a current that flows into the second switching element by cutting off a connection of the second switching element so as to prevent generation of a reverse current that flows in a direction of the second switching element from the output terminal.

According to another aspect of this disclosure, there is provided a control circuit of a switching regulator of a synchronous rectification type, the switching regulator including a first switching element configured to perform switching in accordance with a control signal input thereto; an inductor configured to be charged with an input voltage input to an input terminal of the switching regulator by the switching of the first switching element; and a second switching element for synchronous rectification configured to perform switching in accordance with a control signal input thereto so as to discharge the inductor, wherein the switching of the first switching element is controlled so that an output voltage output from an output terminal of the switching regulator is a predetermined constant voltage, and the second switching element is caused to perform the switching inversely to the first switching element, so that the input voltage input to the input terminal is converted into the predetermined constant voltage and the predetermined constant voltage is output to a load connected to the output terminal, the control circuit including: a control circuit part configured to control the switching of the first switching element so that the output voltage output from the output terminal is the predetermined constant voltage, and to cause the second switching element to perform the switching inversely to the first switching element; and a reverse current prevention circuit part configured to interrupt a current that flows into the second switching element by cutting off a connection of the second switching element so as to prevent generation of a reverse current that flows in a direction of the second switching element from the output terminal.

According to another aspect of this disclosure, there is provided a method of controlling an operation of a switching regulator of a synchronous rectification type, the switching regulator including a first switching element configured to perform switching in accordance with a control signal input thereto; an inductor configured to be charged with an input voltage input to an input terminal of the switching regulator by the switching of the first switching element; and a second switching element for synchronous rectification configured to perform switching in accordance with a control signal input thereto so as to discharge the inductor, wherein the switching of the first switching element is controlled so that an output voltage output from an output terminal of the switching regulator is a predetermined constant voltage, and the second switching element is caused to perform the switching inversely to the first switching element, so that the input voltage input to the input terminal is converted into the predetermined constant voltage and the predetermined constant voltage is output to a load connected to the output terminal, the method including interrupting a current that flows into the second switching element by cutting off a connection of the second switching element so as to prevent generation of a reverse current that flows in a direction of the second switching element from the output terminal.

According to the aforementioned switching regulator of a synchronous rectification type, control circuit thereof, and method of controlling the operation of the switching regulator, a current that flows into a switching element for synchronous rectification is interrupted by cutting off the connection of the switching element for synchronous rectification in order to prevent generation of a reverse current that flows in the direction of the switching element for synchronous rectification from an output terminal. Since the reverse current that flows into the switching element for synchronous rectification can be interrupted using a circuit independent of the control circuit system of the switching element for synchronous rectification, it is possible to reduce the delay in time between detection of generation of the reverse current and interruption of the reverse current, thus making it possible to improve efficiency. Further, this also facilitates designing, thus making it possible to perform designing with efficiency.

BRIEF DESCRIPTION OF THE DRAWINGS

The aforementioned and other aspects, features and advantages will become more apparent from the following detailed description when read in conjunction with the accompanying drawings, in which.

BEST MODE FOR CARRYING OUT THE INVENTION

Next, a description is given, with reference to the accompanying drawings, of embodiments of the present invention.

First Embodiment

Figure 1:
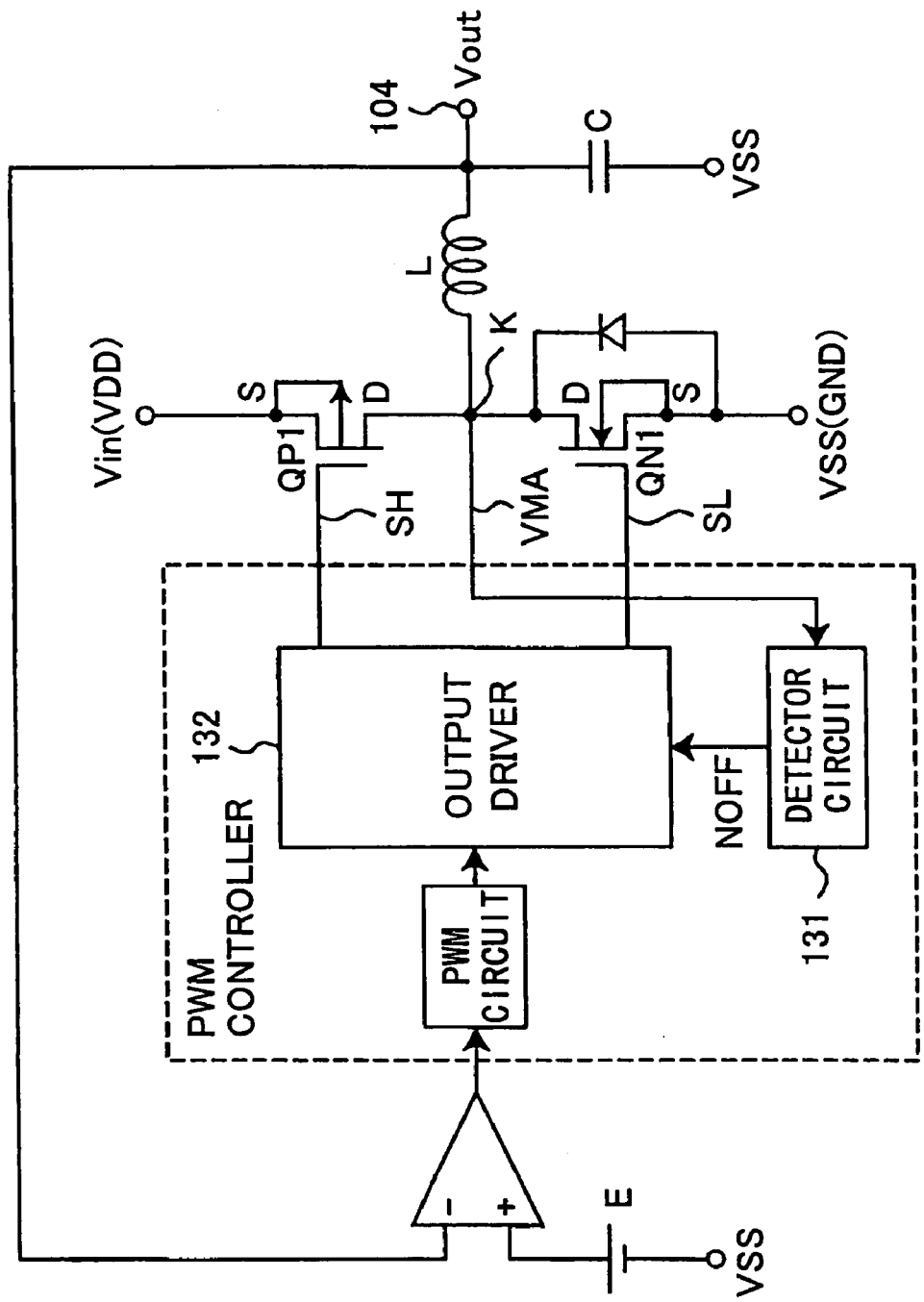
FIG. 1 is a circuit diagram showing a conventional switching regulator of a synchronous rectification type.
Figure 2:
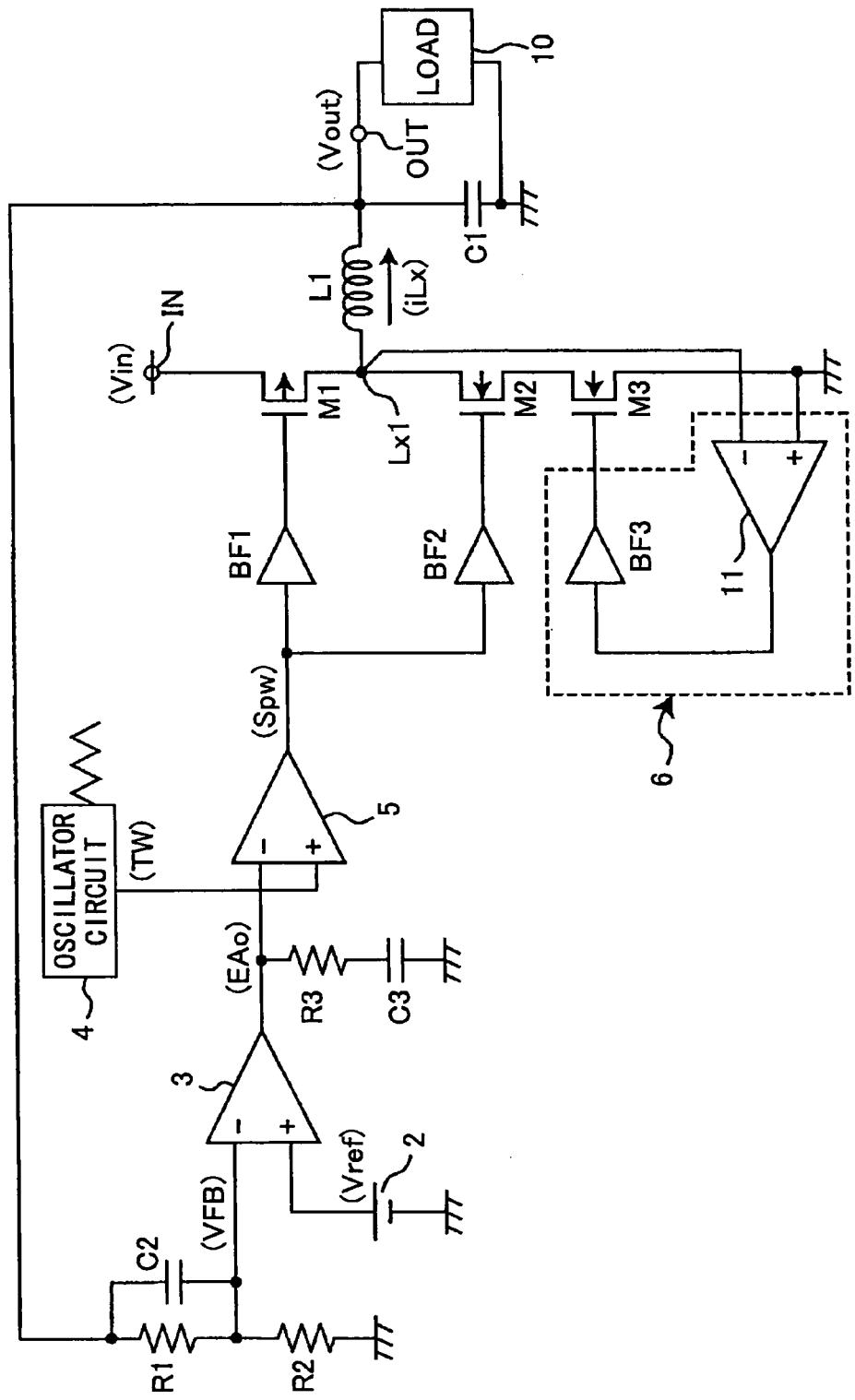
FIG. 2 is a circuit diagram showing a switching regulator of a synchronous rectification type according to a first embodiment of the present invention.

FIG. 2 is a circuit diagram showing a switching regulator 1 of a synchronous rectification type according to a first embodiment of the present invention.

Referring to FIG. 2, the synchronous rectification switching regulator 1 converts an input voltage Vin, which is a voltage input to an input terminal IN as an input voltage, into a predetermined constant voltage, and outputs the constant voltage from an output terminal OUT to a load 10 as an output voltage Vout.

The switching regulator 1 includes a first switching device M1 that performs switching for performing output control of the input voltage Vin and a second switching device M2 for synchronous rectification. The first switching device M1 is formed of a PMOS transistor, and the second switching device M2 is formed of an NMOS transistor.

The switching regulator 1 further includes a reference voltage generator circuit 2, resistors R1 and R2 for output voltage detection, an inductor L1, a capacitor C1 for smoothing, a resistor R3 and capacitors C2 and C3 for phase compensation, an error amplifier circuit 3, an oscillator circuit 4, a PWM comparator 5, buffers BF1 and BF2, a third switching device M3 formed of an NMOS transistor, and a reverse current detector circuit 6. The reverse current detector circuit 6 includes a comparator 11 and a buffer BF3. In the switching regulator 1, the reference voltage generator circuit 2, the resistors R1 through R3, the error amplifier circuit 3, the oscillator circuit 4, the PWM comparator 5, the buffers BF1 and BF2, and the capacitors C2 and C3 may form a control circuit part, and the third switching device M3 and the reverse current detector circuit 6 may form a reverse current prevention circuit part. Further, in the switching regulator 1, the circuits except for the inductor L1 and the capacitor C1 may be integrated into a single IC. Alternatively, the circuits except for the first through third switching devices M1 through M3, the inductor L1, and the capacitor C1 may be integrated into a single circuit.

The reference voltage generator circuit 2 generates and outputs a predetermined reference voltage Vref. The resistors R1 and R2 for output voltage detection divide the output voltage Vout, thereby generating and outputting a divided voltage VFB. Further, the error amplifier circuit 3 amplifies the difference (voltage difference) between the input divided voltage VFB and the reference voltage Vref, thereby generating and outputting an output signal EAo.

The oscillator circuit 4 generates and outputs a predetermined triangle wave signal TW. The PWM comparator 5 generates a pulse signal Spw for performing PWM control from the output signal EAo of the error amplifier circuit 3 and the triangle wave signal TW, and outputs the generated pulse signal Spw. The pulse signal Spw is input to the gate of the first switching device M1 through the buffer BF1 and to the gate of the second switching device M2 through the buffer BF2. The reverse current detector circuit 6 detects a sign or indication of generation of reverse current in the second switching device M2. When detecting an indication of generation of the reverse current, the reverse current detector circuit 6 turns OFF the third switching device M3 so as to interrupt (cut off) the connection between the second switching device M2 and ground, thereby preventing the reverse current from being generated.

The first through third switching devices M1 through M3 are connected in series between the input terminal IN and ground. The inductor L1 is connected between the output terminal OUT and a connection Lx1 of the first switching device M1 and the second switching device M2. The resistors R1 and R2 are connected in series and the capacitor C1 is connected between the output terminal OUT and ground. The divided voltage VFB is output from the connection of the resistors R1 and R2. The capacitor C2 for phase compensation is connected in parallel to the resistor R1. The divided voltage VFB and the reference voltage Vref are input to the inverting input and the non-inverting input, respectively, of the error amplifier circuit 3. The output of the error amplifier circuit 3 is connected to the inverting input of the PWM comparator 5.

Further, a series circuit of the resistor R3 and the capacitor C3 is connected between the output of the error amplifier circuit 3 and ground. The series circuit forms a phase compensation circuit. The triangle wave signal TW is input to the non-inverting input of the PWM comparator 5. The pulse signal Spw output from the PWM comparator 5 is input to the gate of the first switching device M1 through the buffer BF1 and to the gate of the second switching device M2 through the buffer BF2. The inverting input of the comparator 11 is connected to the connection Lx1, and the non-inverting input of the comparator 11 is connected to ground. The output of the comparator 11 is connected to the gate of the third switching device M3 through the buffer BF3.

In this configuration, when the voltage at the connection Lx1 is less than ground voltage and there is no sign or indication of generation of a reverse current that flows from the connection Lx1 to ground, the comparator 11 outputs a high-level signal so that the third switching device M3 turns ON to conduct. When the output voltage Vout of the switching regulator 1 increases in this state, the voltage of the output signal EAo of the error amplifier circuit 3 decreases so that the duty cycle of the pulse signal Spw from the PWM comparator 5 is reduced. As a result, the first switching device M1 is ON for a shorter period of time and the second switching device M2 is ON for a longer period of time accordingly, so that the output voltage Vout of the switching regulator 1 is controlled so as to decrease.

On the other hand, when the output voltage Vout of the switching regulator 1 decreases, the voltage of the output signal EAo of the error amplifier circuit 3 increases so that the duty cycle of the pulse signal Spw from the PWM comparator 5 increases. As a result, the ON period of the first switching device M1 becomes longer and the ON period of the second switching device M2 becomes shorter accordingly, so that the output voltage Vout of the switching regulator 1 is controlled so as to increase. The output voltage Vout is controlled to be constant at a predetermined voltage by repeating these operations.

Next, when the voltage at the connection Lx1 becomes equal to ground voltage so that an indication of generation of reverse current is detected, or when the voltage at the connection Lx1 exceeds ground voltage so that generation of reverse current is detected, the comparator 11 outputs a low-level signal so that the third switching device M3 turns OFF to not conduct (to be in an interrupting or cut-off state). At this point, the second switching device M2 remains ON.

Thus, the reverse current detector circuit 6 determines from the voltage at the connection Lx1 whether there is an indication of current backflow or reverse current flow to the second switching device M2. When detecting the indication, the reverse current detector circuit 6 turns OFF the third switching device M3 connected in series to the second switching device M2, thereby interrupting the connection between the second switching device M2 and ground. This ensures prevention of generation of a reverse current that flows into the second switching device M2. Further, a reverse current that flows into the second switching device M2 is interrupted using a circuit independent of the control circuit system of the second switching device M2. This makes it possible to reduce the delay in time between detection of generation of the reverse current and interruption of the reverse current, thus making it possible to improve efficiency. Further, this also facilitates designing, thus making it possible to perform designing with efficiency.

FIG. 2 shows the case of a switching regulator of a voltage mode control type, while the present invention is also applicable to a switching regulator of a current mode control type.

Figure 3:
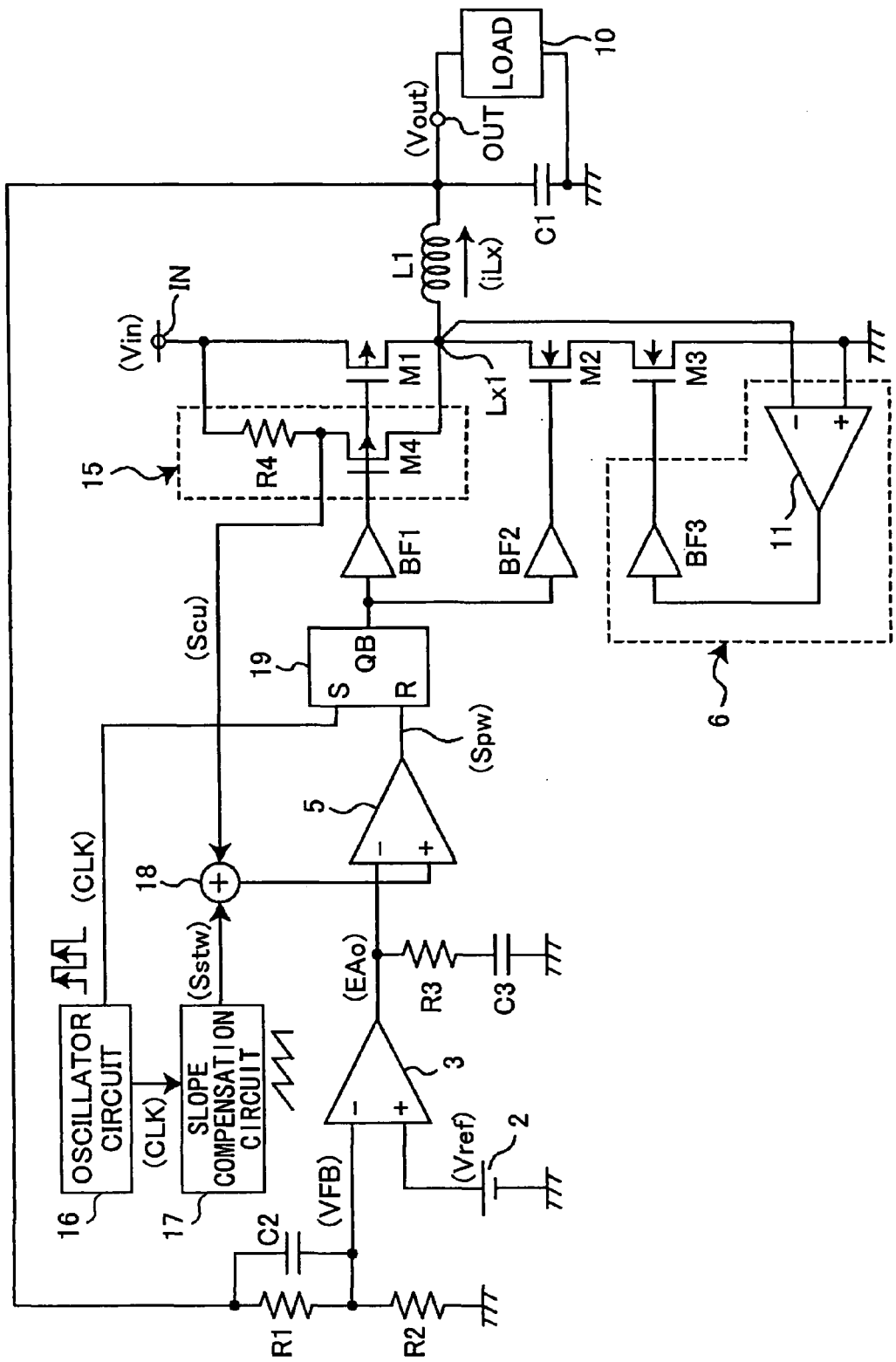
FIG. 3 is a circuit diagram showing another configuration of the synchronous rectification switching regulator according to the first embodiment of the present invention.

FIG. 3 shows an application to a switching regulator of a current mode control type. In FIG. 3, the same elements as or elements similar to those of FIG. 2 are referred to by the same reference numerals, and a description thereof is omitted. A description is given below of one or more differences from the configuration of FIG. 2.

The configuration of FIG. 3 is different from the configuration of FIG. 2 in that the oscillator circuit 4 of FIG. 2 is removed while a current detector circuit 15, an oscillator circuit 16 that generates and outputs a clock signal CLK of a predetermined rectangular waveform, a slope compensation circuit 17, an adder circuit 18, and a flip-flop circuit 19 are added.

The switching regulator 1 of FIG. 3 includes the first switching device M1, the second switching device M2 for synchronous rectification, the reference voltage generator circuit 2, the resistors R1 and R2 for output voltage detection, the inductor L1, the capacitor C1 for smoothing, the resistor R3 and the capacitors C2 and C3 for phase compensation, the error amplifier circuit 3, the PWM comparator 5, the buffers BF1 and BF2, the third switching device M3, and the reverse current detector circuit 6. The switching regulator 1 of FIG. 3 further includes the current detector circuit 15, the oscillator circuit 16 that generates and outputs the clock signal CLK, the slope compensation circuit 17 that generates a predetermined sawtooth signal Sstw from the clock signal CLK and outputs the sawtooth signal Sstw, the adder circuit 18, and the flip-flop circuit 19.

The current detector circuit 15 is formed of a series circuit of a resistor R4 and a fourth switching device M4. The fourth switching device M4 is formed of a MOS transistor of the same type as the first switching device M1, that is, a PMOS transistor. In FIG. 3, the reference voltage generator circuit 2, the resistors R1 through R3, the error amplifier circuit 3, the oscillator circuit 16, the PWM comparator 5, the buffers BF1 and BF2, the capacitors C2 and C3, the current detector circuit 15, the slope compensation circuit 17, the adder circuit 18, and the flip-flop circuit 19 may form a control circuit part.

The clock signal CLK output from the oscillator circuit 16 is input to the slope compensation circuit 17 and the set input S of the flip-flop circuit 19. The slope compensation circuit 17 generates the sawtooth wave signal Sstw from the input clock signal CLK and outputs the generated sawtooth wave signal Sstw to the adder circuit 18. The series circuit of the resistor R4 and the fourth switching device M4 is connected in parallel to the first switching device M1. The gate of the fourth switching device M4 is connected to the gate of the first switching device M1, so that the fourth switching device M4 turns ON and OFF in synchronization with the first switching device M1. A current proportional to the output current of the first switching device M1 flows through the resistor R4. The current is converted into voltage by the resistor R4, and the voltage at the connection of the resistor R4 and the fourth switching device M4 is output to the adder circuit 18 as a signal Scu.

The adder circuit 18 adds up the input sawtooth wave signal Sstw and signal Scu and outputs a signal corresponding to the sum of the input signals Sstw and Scu to the non-inverting input of the PWM comparator 5.

The PWM comparator 5 generates the pulse signal Spw for performing PWM control from the output signal EAo of the error amplifier circuit 3 and the output signal of the adder circuit 18, and outputs the generated pulse signal Spw to the reset input R of the flip-flop circuit 19. The inverting output QB of the flip-flop circuit 19 is connected to the gates of the first and fourth switching devices M1 and M4 through the buffer BF1 and to the gate of the second switching device M2 through the buffer BF2.

In this configuration, the clock signal CLK is input to the set input S of the flip-flop circuit 19. The flip-flop circuit 19 is set at the rise or fall of the clock signal CLK so as to make the level of the inverting output QB LOW. The output of the PWM comparator 5 is connected to the reset input R of the flip-flop circuit 19. After being set, the flip-flop circuit 19 is reset by the pulse signal Spw fed from the PWM comparator 5 so as to return the level of the inverting output QB to HIGH. A signal output from the inverting output QB of the flip-flop circuit 19 is input to the gates of the first and fourth switching devices M1 and M4 through the buffer BF1 and to the gate of the second switching device M2 through the buffer BF2. The operation of the reverse current detector circuit 6 is the same as in the case of FIG. 2, and accordingly a description thereof is omitted. Thus, the same effects as in the case of FIG. 2 can be produced by the switching regulator 1 of a current mode control type as shown in FIG. 3.

Figure 4:
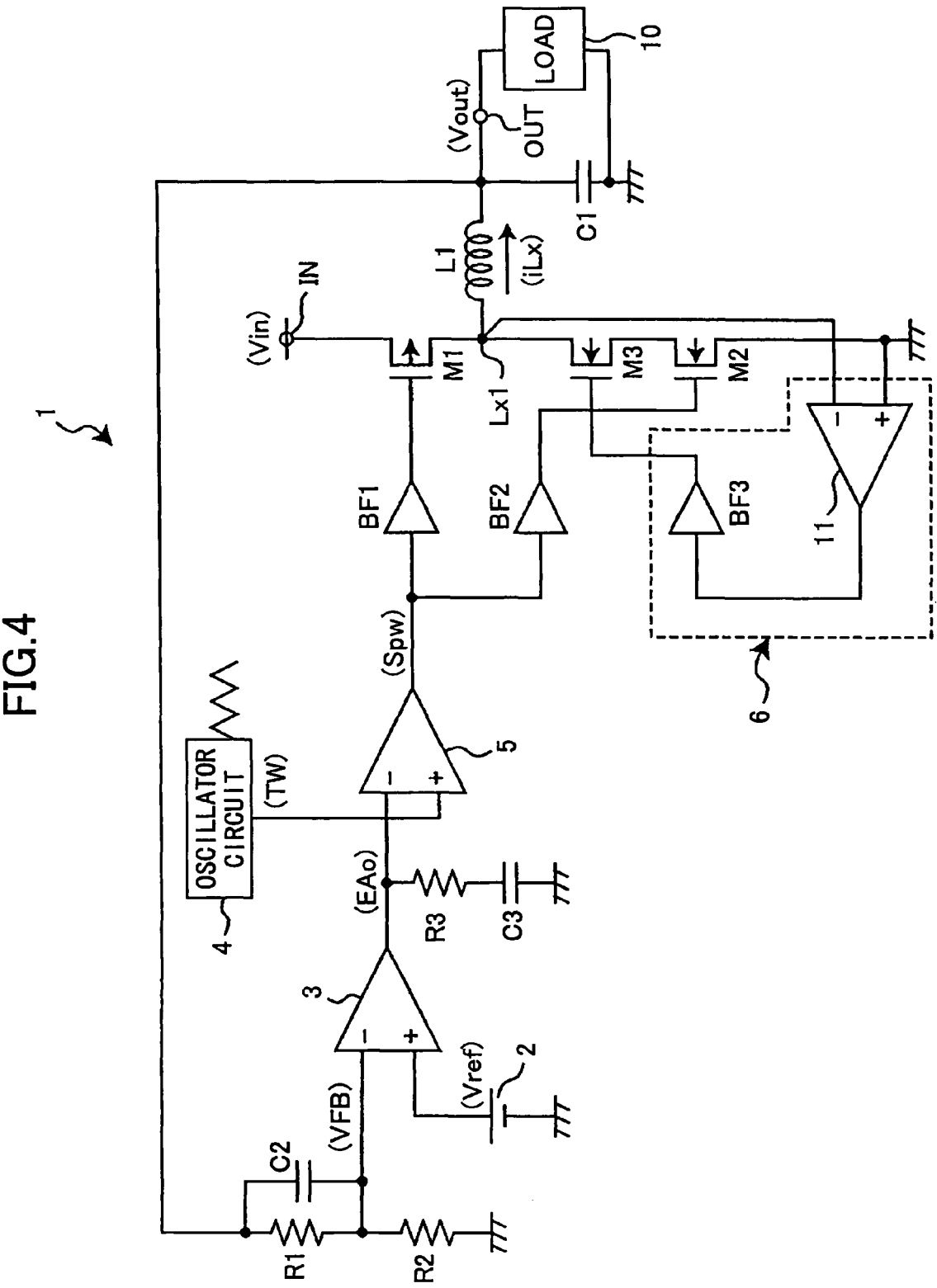
FIG. 4 is a circuit diagram showing yet another configuration of the synchronous rectification switching regulator according to the first embodiment of the present invention.

In FIGS. 2 and 3, the third switching device M3 is connected between the second switching device M2 and ground. Alternatively, the third switching device M3 may be connected between the connection Lx1 and the second switching device M2. Such a case is shown in FIG. 4, where the configuration of FIG. 2 is modified by connecting the third switching device M3 between the connection Lx1 and the second switching device M2. The configuration of FIG. 3 can also be modified in the same manner.

Second Embodiment

In the first embodiment, a description is given taking a step-down switching regulator as an example, while the present invention is also applicable to a step-up switching regulator as described below in a second embodiment.

Figure 5:
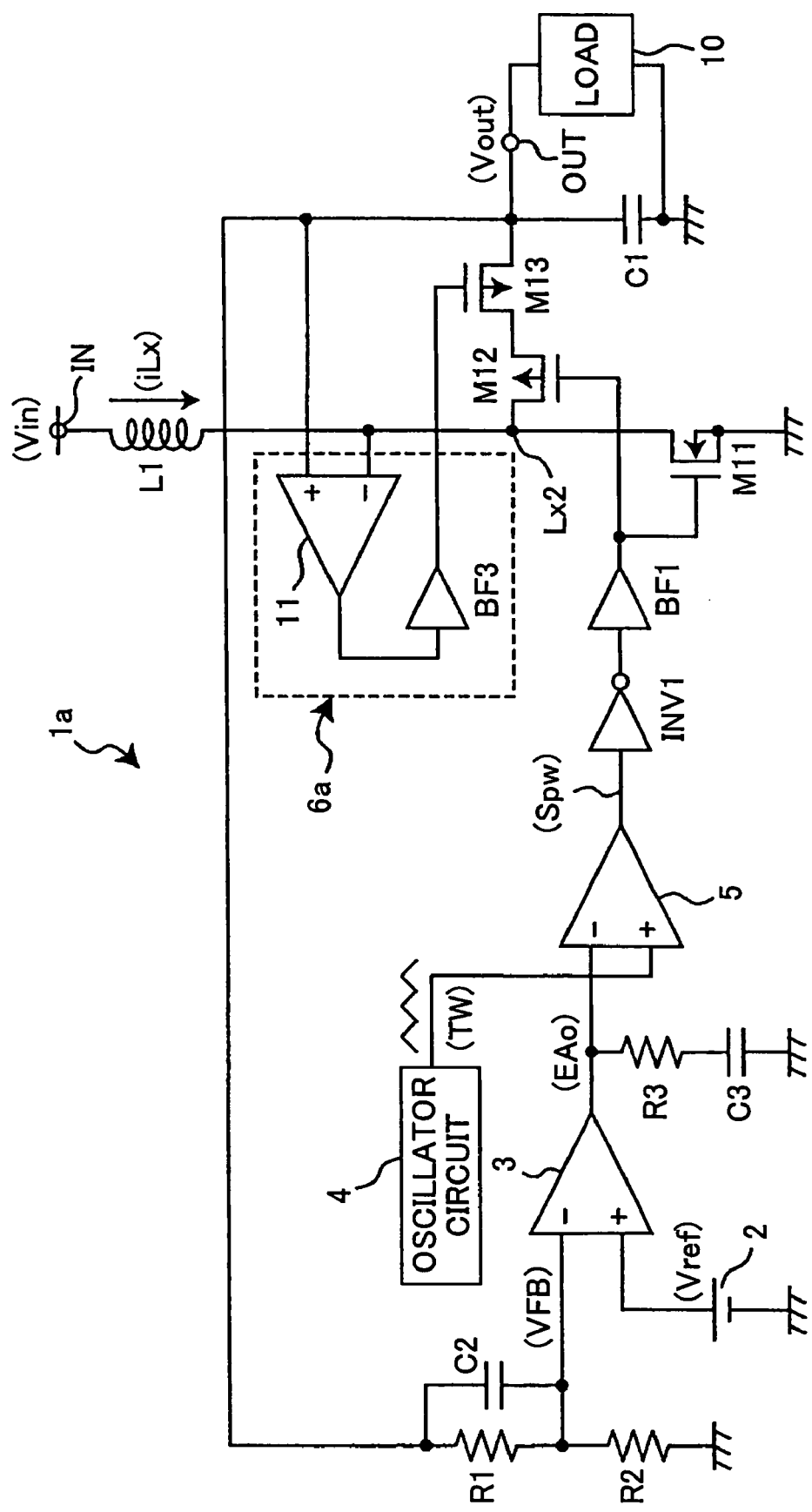
FIG. 5 is a circuit diagram showing a switching regulator of a synchronous rectification type according to a second embodiment of the present invention.

FIG. 5 is a circuit diagram showing a switching regulator 1a of a synchronous rectification type according to the second embodiment of the present invention. In FIG. 5, the same elements as or elements similar to those of FIG. 2 are referred to by the same numerals, and a description thereof is omitted. A description is given below of one or more differences from the switching regulator 1 of FIG. 2.

Referring to FIG. 5, the switching regulator 1a includes a first switching device M11 that performs switching for performing output control of the input voltage Vin and a second switching element M12 for synchronous rectification. The first switching device M11 is formed of an NMOS transistor, and the second switching device M12 is formed of a PMOS transistor.

The switching regulator 1a further includes the reference voltage generator circuit 2, the resistors R1 and R2 for output voltage detection, the inductor L1, the capacitor C1 for smoothing, the resistor R3 and the capacitors C2 and C3 for phase compensation, the error amplifier circuit 3, the oscillator circuit 4, the PWM comparator 5, the buffer BF1, an inverter INV1, the third switching device M13 formed of a PMOS transistor, and a reverse current detector circuit 6a. Further, the reverse current detector circuit 6a includes the comparator 11 and the buffer BF3.

In the switching regulator 1a, the reference voltage generator circuit 2, the resistors R1 through R3, the error amplifier circuit 3, the oscillator circuit 4, the PWM comparator 5, the buffer BF1, the inverter INV1, and the capacitors C2 and C3 may form a circuit control part, and the third switching device M13 and the reverse current detector circuit 6a may form a reverse current prevention circuit part. Further, in the switching regulator 1a, the circuits except for the inductor L1 and the capacitor C1 may be integrated into a single IC. Alternatively, the circuits except for the first through third switching devices M11 through M13, the inductor L1, and the capacitor C1 may be integrated into a single circuit.

The buffer BF1 outputs the pulse signal Spw input thereto through the inverter INV1 to the gate of each of the first and second switching devices M11 and M12. The reverse current detector circuit 6a prevents generation of reverse current by interrupting (cutting off) the connection between the second switching device M12 and the output terminal OUT. The inductor L1 and the first switching device M11 are connected in series between the input terminal IN and ground. The second switching device M12 and the third switching device M13 are connected in series between the output terminal OUT and a connection Lx2 of the inductor L1 and the first switching device M11. The inverting input and the non-inverting input of the comparator 11 are connected to the connection Lx2 and the output terminal OUT, respectively. The output of the comparator 11 is connected to the gate of the third switching device M13 through the buffer BF3.

In this configuration, when the voltage at the connection Lx2 is greater than the output voltage Vout so that there is no indication of generation of a reverse current that flows from the output terminal OUT to the connection Lx2, the comparator 11 outputs a low-level signal so that the third switching device M13 turns ON to conduct. When the output voltage Vout of the switching regulator 1a increases in this state, the voltage of the output signal EAo of the error amplifier circuit 3 decreases so that the duty cycle of the pulse signal Spw from the PWM comparator 5 is reduced. As a result, the ON period of the first switching device M11 becomes longer and the ON period of the second switching device M12 becomes shorter accordingly, so that the output voltage Vout of the switching regulator 1a is controlled so as to decrease.

On the other hand, when the output voltage Vout of the switching regulator 1a decreases, the voltage of the output signal EAo of the error amplifier circuit 3 increases so that the duty cycle of the pulse signal Spw from the PWM comparator 5 increases. As a result, the ON period of the first switching device M11 becomes shorter and the ON period of the second switching device M12 becomes longer accordingly, so that the output voltage Vout of the switching regulator 1 is controlled so as to increase. The output voltage Vout is controlled to be constant at a predetermined voltage by repeating these operations.

Next, when the voltage at the connection Lx2 becomes equal to the output voltage Vout so that an indication of generation of reverse current is detected, or when the voltage at the connection Lx2 is less than the output voltage Vout so that generation of reverse current is detected, the comparator 11 outputs a high-level signal so that the third switching device M13 turns OFF to not conduct (to be in an interrupting or cut-off state). At this point, the second switching device M12 remains ON.

Thus, the reverse current detector circuit 6a determines from the voltage at the connection Lx2 whether there is an indication of current backflow or reverse current flow to the second switching device M12. When detecting the indication, the reverse current detector circuit 6a turns OFF the third switching device M13 connected in series to the second switching device M12, thereby interrupting the connection between the second switching device M12 and the output terminal OUT. This ensures prevention of generation of a reverse current that flows into the second switching device M12. Further, a reverse current that flows into the second switching device M12 is interrupted using a circuit independent of the control circuit system of the second switching device M12. This makes it possible to reduce the delay in time between detection of generation of the reverse current and interruption of the reverse current, thus making it possible to improve efficiency. Further, this also facilitates designing, thus making it possible to perform designing with efficiency.

Figure 6:
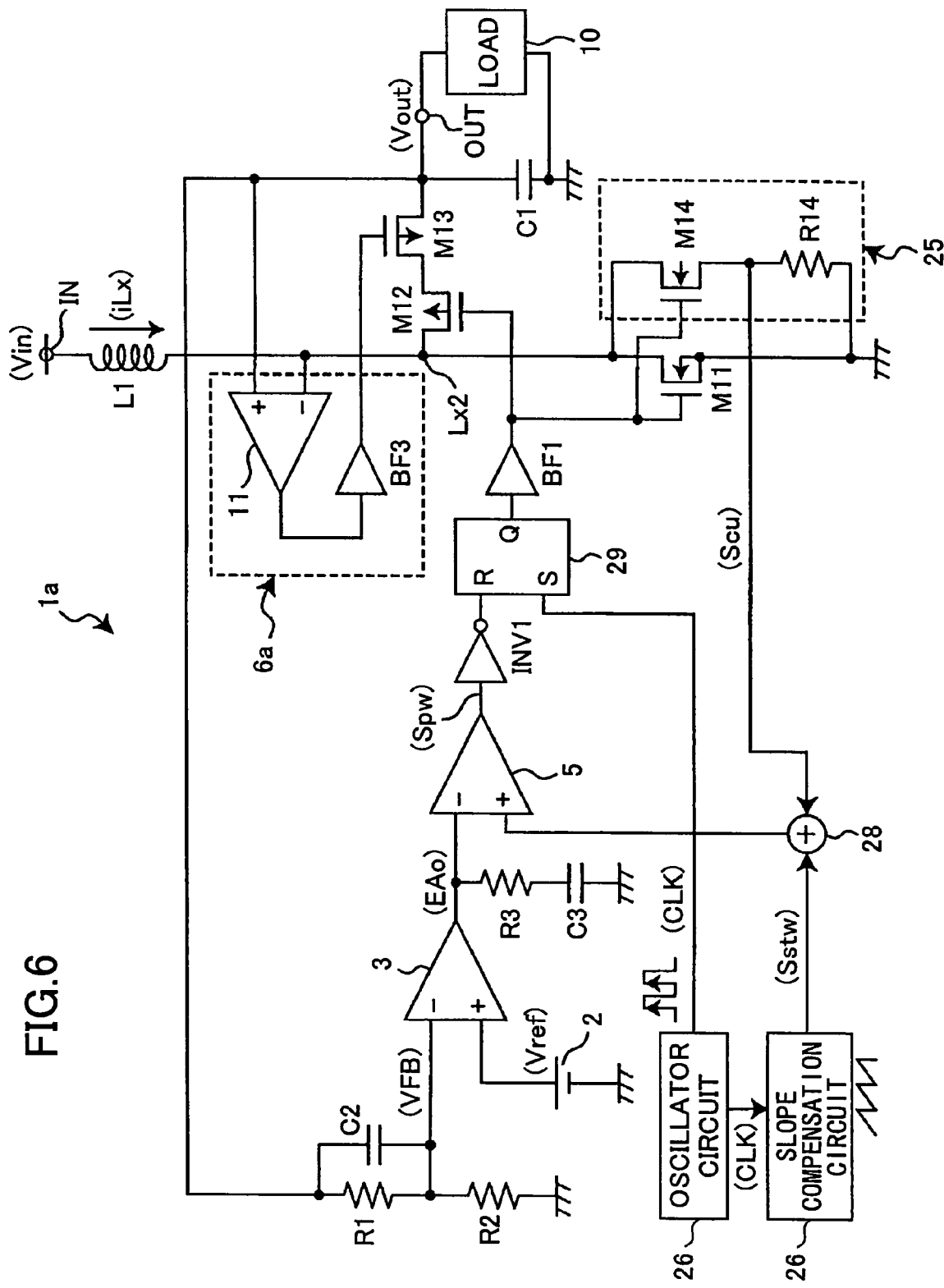
FIG. 6 is a circuit diagram showing another configuration of the synchronous rectification switching regulator according to the second embodiment of the present invention.

FIG. 5 shows the case of a switching regulator of a voltage mode control type, while the present invention is also applicable to a switching regulator of a current mode control type. FIG. 6 shows an application to a switching regulator of a current mode control type. In FIG. 6, the same elements as or elements similar to those of FIG. 5 are referred to by the same reference numerals, and a description thereof is omitted. A description is given below of one or more differences from the configuration of FIG. 5.

The configuration of FIG. 6 is different from the configuration of FIG. 5 in that the oscillator circuit 4 of FIG. 5 is removed while a current detector circuit 25, an oscillator circuit 26 that generates and outputs a clock signal CLK of a predetermined rectangular waveform, a slope compensation circuit 27, an adder circuit 28, and a flip-flop circuit 29 are added.

The switching regulator 1a of FIG. 6 includes the first switching device M11, the second switching device M12 for synchronous rectification, the reference voltage generator circuit 2, the resistors R1 and R2 for output voltage detection, the inductor L1, the capacitor C1 for smoothing, the resistor R3 and the capacitors C2 and C3 for phase compensation, the error amplifier circuit 3, the PWM comparator 5, the buffer BF1, the inverter INV1, the third switching device M13, and the reverse current detector circuit 6a. The switching regulator 1a of FIG. 6 further includes the current detector circuit 25, the oscillator circuit 26 that generates and outputs the clock signal CLK, the slope compensation circuit 27 that generates a predetermined sawtooth signal Sstw from the clock signal CLK and outputs the sawtooth signal Sstw, the adder circuit 28, and the flip-flop circuit 29.

The current detector circuit 25 is formed of a series circuit of a resistor R14 and a fourth switching device M14. The fourth switching device M14 is formed of a MOS transistor of the same type as the first switching device M11, that is, an NMOS transistor. In FIG. 6, the reference voltage generator circuit 2, the resistors R1 through R3, the error amplifier circuit 3, the oscillator circuit 26, the PWM comparator 5, the buffer BF1, the inverter INV1, the capacitors C2 and C3, the current detector circuit 25, the slope compensation circuit 27, the adder circuit 28, and the flip-flop circuit 29 may form a control circuit part.

The clock signal CLK output from the oscillator circuit 26 is input to the slope compensation circuit 27 and the set input S of the flip-flop circuit 29. The slope compensation circuit 27 generates the sawtooth wave signal Sstw from the input clock signal CLK and outputs the generated sawtooth wave signal Sstw to the adder circuit 28. The series circuit of the resistor R14 and the fourth switching device M14 is connected in parallel to the first switching device M11. The gate of the fourth switching device M14 is connected to the gate of the first switching device M11, so that the fourth switching device M14 turns ON and OFF in synchronization with the first switching device M11. A current proportional to the current flowing through the first switching device M11 flows through the resistor R14. The current is converted into voltage by the resistor R14, and the voltage at the connection of the resistor R14 and the fourth switching device M14 is output to the adder circuit 28 as a signal Scu.

The adder circuit 28 adds up the input sawtooth wave signal Sstw and signal Scu and outputs a signal corresponding to the sum of the input signals Sstw and Scu to the non-inverting input of the PWM comparator 5.

The PWM comparator 5 generates the pulse signal Spw for performing PWM control from the output signal EAo of the error amplifier circuit 3 and the signal input from the adder circuit 28, and outputs the generated pulse signal Spw to the reset input R of the flip-flop circuit 29 through the inverter INV1. The output Q of the flip-flop circuit 29 is connected to the gate of each of the first, second, and fourth switching devices M11, M12, and M14 through the buffer BF1.

In this configuration, the clock signal CLK is input to the set input S of the flip-flop circuit 29. The flip-flop circuit 29 is set at the rise or fall of the clock signal CLK so as to make the level of the output Q HIGH. The pulse signal Spw fed from the PWM comparator 5 is input to the reset input R of the flip-flop circuit 29 through the inverter INV1. After being set, the flip-flop circuit 29 is reset by the pulse signal Spw fed from the PWM comparator 5 so as to return the level of the output Q to LOW. A signal output from the output Q of the flip-flop circuit 29 is input to the gate of each of the first, second, and fourth switching devices M11, M12, and M14 through the buffer BF1. The operation of the reverse current detector circuit 6a is the same as in the case of FIG. 5, and accordingly a description thereof is omitted. Thus, the same effects as in the case of FIG. 5 can be produced by the switching regulator 1a of a current mode control type as shown in FIG. 6.

Figure 7:
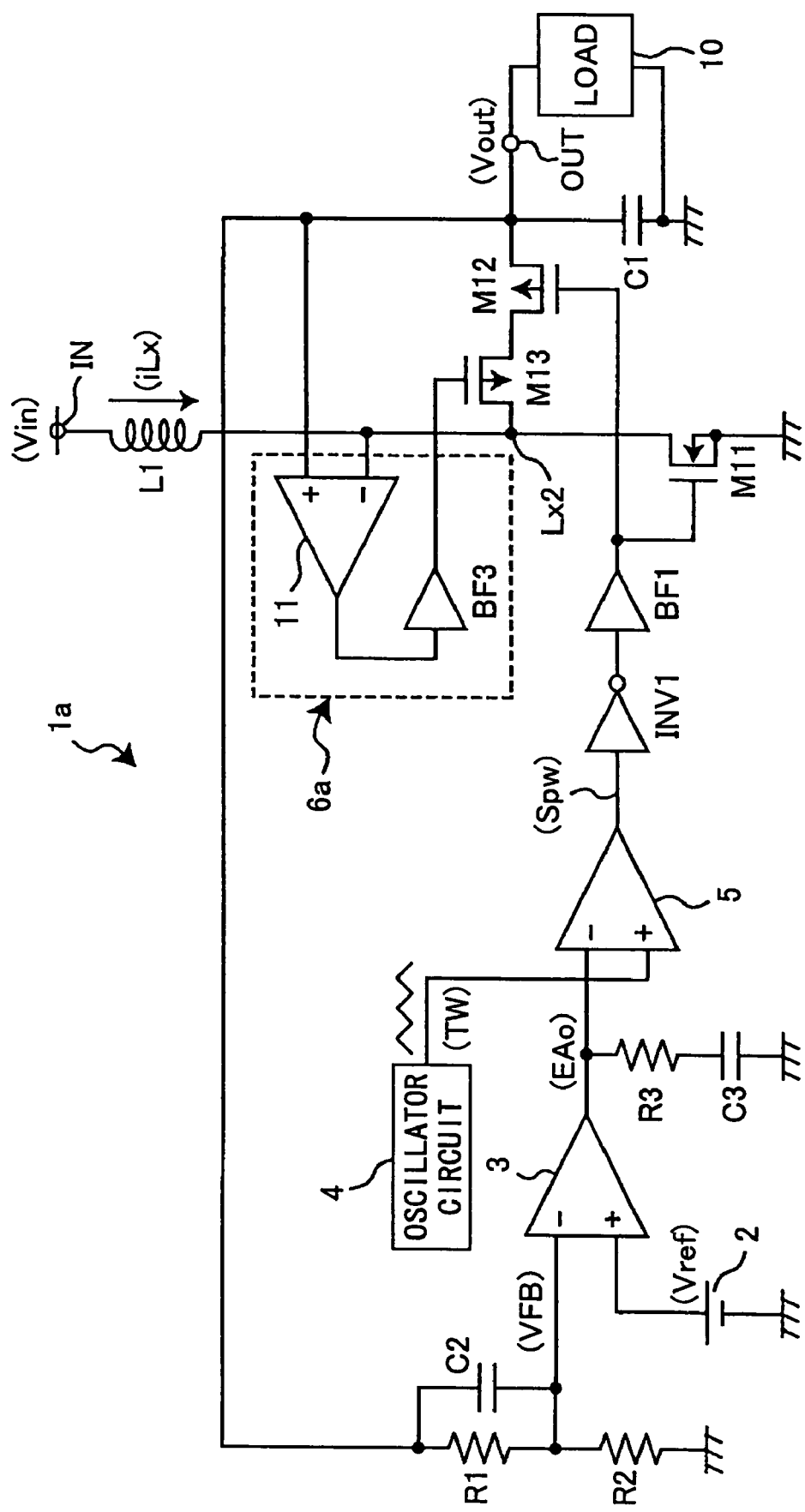
FIG. 7 is a circuit diagram showing yet another configuration of the synchronous rectification switching regulator according to the second embodiment of the present invention.

In FIGS. 5 and 6, the third switching device M13 is connected between the second switching device M12 and the output terminal OUT. Alternatively, the third switching device M13 may be connected between the connection Lx2 and the second switching device M12. Such a case is shown in FIG. 7, where the configuration of FIG. 5 is modified by connecting the third switching device M13 between the connection Lx2 and the second switching device M12. The configuration of FIG. 6 can also be modified in the same manner.

Third Embodiment

In the above-described first embodiment, the voltage at the connection Lx1 and ground voltage are compared in order to detect generation of reverse current or an indication thereof. Therefore, the comparator 11 of the reverse current detector circuit 6 is constantly in operation. Alternatively, as shown below in a third embodiment, when current backflow (reverse current) is detected so that the third switching device M3 connected in series to the second switching device M2 for synchronous rectification is caused to turn OFF to be in a cut-off state, the voltage comparison operation of the comparator 11 may be stopped by latching the output signal of the comparator 11 input to the gate of the turned-off third switching device M3.

Figure 8:
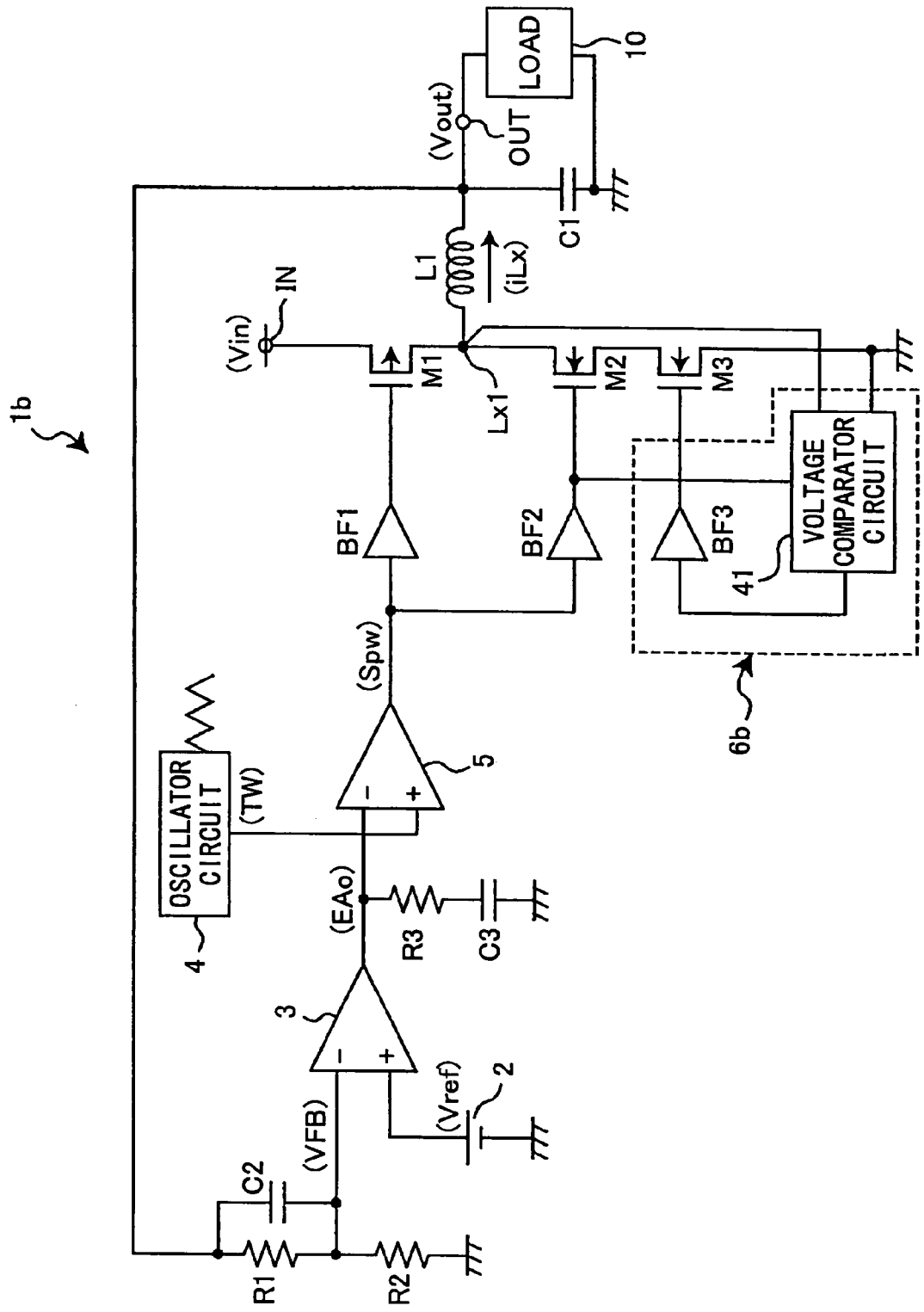
FIG. 8 is a circuit diagram showing a switching regulator of a synchronous rectification type according to a third embodiment of the present invention.

FIG. 8 is a circuit diagram showing a switching regulator 1b of a synchronous rectification type according to the third embodiment of the present invention. In FIG. 8, the same elements as or elements similar to those of FIG. 2 are referred to by the same reference numerals, and a description thereof is omitted. A description is given below of one or more differences from the switching regulator 1 of FIG. 2.

The switching regulator 1b of FIG. 8 is different from the switching regulator 1 of FIG. 2 in that the comparator 11 of the reverse current detector circuit 6 of FIG. 2 is replaced by a voltage comparator circuit 41. As a result of this replacement, the reverse current detector circuit 6 of FIG. 2 is replaced by a reverse current detector circuit 6b.

Referring to FIG. 8, the synchronous rectification switching regulator 1b converts the input voltage Vin, which is a voltage input to the input terminal IN as an input voltage, into a predetermined constant voltage, and outputs the constant voltage from the output terminal OUT to the load 10 as the output voltage Vout.

The switching regulator 1b includes the first switching device M1, the second switching device M2, the reference voltage generator circuit 2, the resistors R1 and R2 for output voltage detection, the inductor L1, the capacitor C1 for smoothing, the resistor R3 and the capacitors C2 and C3 for phase compensation, the error amplifier circuit 3, the oscillator circuit 4, the PWM comparator 5, the buffers BF1 and BF2, the third switching device M3, and the reverse current detector circuit 6b.

The reverse current detector circuit 6b includes the voltage comparator circuit 41 and the buffer BF3. In the switching regulator 1b, the reference voltage generator circuit 2, the resistors R1 through R3, the error amplifier circuit 3, the oscillator circuit 4, the PWM comparator 5, the buffers BF1 and BF2, and the capacitors C2 and C3 may form a control circuit part, and the third switching device M3 and the reverse current detector circuit 6b may form a reverse current prevention circuit part. Further, in the switching regulator 1b, the circuits except for the inductor L1 and the capacitor C1 may be integrated into a single IC. Alternatively, the circuits except for the first through third switching devices M1 through M3, the inductor L1, and the capacitor C1 may be integrated into a single circuit.

The reverse current detector circuit 6b detects a sign or indication of generation of reverse current in the second switching device M2. When detecting an indication of generation of the reverse current, the reverse current detector circuit 6b turns OFF the third switching device M3 so as to interrupt (cut off) the connection between the second switching device M2 and ground, thereby preventing the reverse current from being generated. The voltage at the connection Lx1 and ground voltage are input to the voltage comparator circuit 41. Further, the output signal of the buffer BF2 is input to the voltage comparator circuit 41. The output of the voltage comparator circuit 41 is connected to the gate of the third switching device M3 through the buffer BF3.

In this configuration, when the voltage at the connection Lx1 is less than ground voltage and there is no indication of generation of a reverse current that flows from the connection Lx1 to ground, the voltage comparator circuit 41 outputs a high-level signal so that the third switching device M3 turns ON to conduct. Next, when the voltage at the connection Lx1 becomes equal to ground voltage so that an indication of generation of reverse current is detected, or when the voltage at the connection Lx1 exceeds ground voltage so that generation of reverse current is detected, the voltage comparator circuit 41 latches and outputs a low-level signal, and stops the voltage comparison operation so as to enter a low current consumption mode. Therefore, the third switching device M3 turns OFF to not conduct (to be in an interrupting or cut-off state). At this point, the second switching device M2 remains ON. When a low-level signal is output from the buffer BF2 in order to cause the second switching device M2 to turn OFF to be in a cut-off state, the voltage comparator circuit 41 starts the voltage comparison operation. When the voltage at the connection Lx1 becomes lower than ground voltage, the voltage comparator circuit 41 releases the latch on the low-level signal, and outputs a high-level signal.

The above-description is given of the case of having the circuit configuration of FIG. 2. The same applies to the case of having the circuit configuration of FIG. 3. In this case, the reverse current detector circuit 6 of FIG. 3 may be replaced by the reverse current detector circuit 6b shown in FIG. 8. Accordingly, a description thereof is omitted.

Thus, according to the switching regulator 1b of the third embodiment, the reverse current detector circuit 6b performs the same operations as the reverse current detector circuit 6 of FIG. 2, and when an indication of generation of reverse current is detected or when the voltage at the connection Lx1 exceeds ground voltage so that generation of reverse current is detected, the reverse current detector circuit 6b stops a voltage comparison operation so as to enter a low current consumption mode after latching and outputting a signal for causing the third switching device M3 to turn OFF to be in a cut-off state. Therefore, the same effects as in the first embodiment can be produced, and current consumption can be reduced.

Fourth Embodiment

In the above-described second embodiment, the voltage at the connection Lx2 and the output voltage Vout are compared in order to detect generation of reverse current or an indication thereof. Therefore, the comparator 11 of the reverse current detector circuit 6a is in constant operation. Alternatively, as shown below in a fourth embodiment, when current backflow (reverse current) is detected so that the third switching device M13 connected in series to the second switching device M12 for synchronous rectification is caused to turn OFF to be in a cut-off state, the voltage comparison operation of the comparator 11 may be stopped by latching the output signal of the comparator 11 input to the gate of the turned-off third switching device M13.

Figure 9:
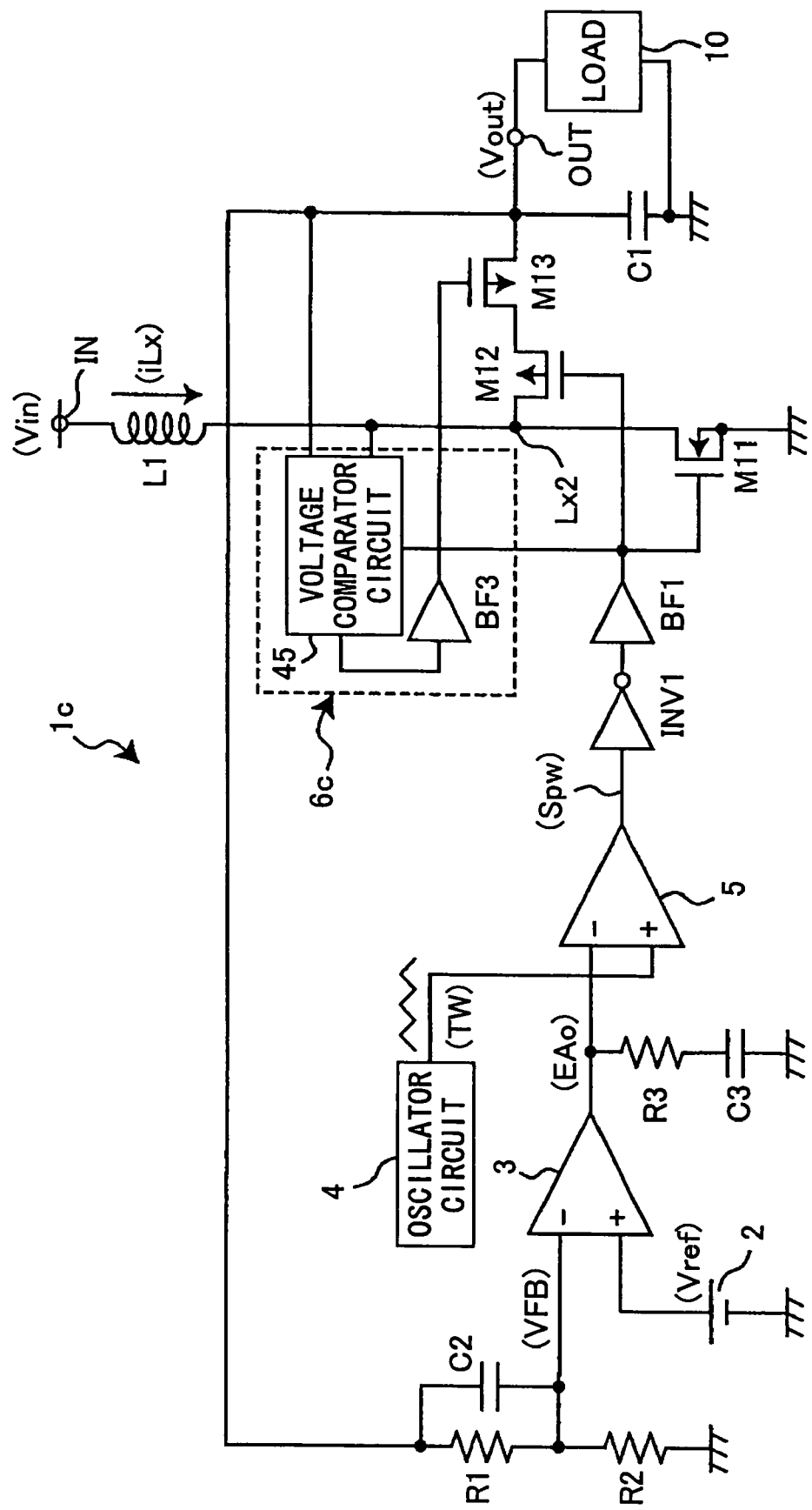
FIG. 9 is a circuit diagram showing a switching regulator of a synchronous rectification type according to a fourth embodiment of the present invention.

FIG. 9 is a circuit diagram showing a switching regulator 1c of a synchronous rectification type according to the fourth embodiment of the present invention. In FIG. 9, the same elements as or elements similar to those of FIG. 5 are referred to by the same reference numerals, and a description thereof is omitted. A description is given below of one or more differences from the switching regulator 1a of FIG. 5.

The switching regulator 1c of FIG. 9 is different from the switching regulator 1a of FIG. 5 in that the comparator 11 of the reverse current detector circuit 6a of FIG. 5 is replaced by a voltage comparator circuit 45. As a result of this replacement, the reverse current detector circuit 6a of FIG. 5 is replaced by a reverse current detector circuit 6c.

Referring to FIG. 9, the switching regulator 1c includes the first switching device M11, the second switching device M12, the reference voltage generator circuit 2, the resistors R1 and R2 for output voltage detection, the inductor L1, the capacitor C1 for smoothing, the resistor R3 and the capacitors C2 and C3 for phase compensation, the error amplifier circuit 3, the oscillator circuit 4, the PWM comparator 5, the buffer BF1, the inverter INV1, the third switching device M13, and the reverse current detector circuit 6c. Further, the reverse current detector circuit 6c includes the voltage comparator circuit 45 and the buffer BF3.

In the switching regulator 1c, the reference voltage generator circuit 2, the resistors R1 through R3, the error amplifier circuit 3, the oscillator circuit 4, the PWM comparator 5, the buffer BF1, the inverter INV1, and the capacitors C2 and C3 may form a control circuit part, and the third switching device M13 and the reverse current detector circuit 6c may form a reverse current prevention circuit part. Further, in the switching regulator 1c, the circuits except for the inductor L1 and the capacitor C1 may be integrated into a single IC. Alternatively, the circuits except for the first through third switching devices M11 through M13, the inductor L1, and the capacitor C1 may be integrated into a single circuit.

The reverse current detector circuit 6c detects a sign or indication of generation of reverse current in the second switching device M12. When detecting an indication of generation of the reverse current, the reverse current detector circuit 6c turns OFF the third switching device M13 so as to interrupt (cut off) the connection between the second switching device M12 and the output terminal OUT, thereby preventing the reverse current from being generated. The voltage at the connection Lx2 and the output voltage Vout are input to the voltage comparator circuit 45. Further, the output signal of the buffer BF1 is input to the voltage comparator circuit 45. The output of the voltage comparator circuit 45 is connected to the gate of the third switching device M13 through the buffer BF3.

In this configuration, when the voltage at the connection Lx2 is greater than the output voltage Vout and there is no indication of generation of a reverse current that flows from the output terminal OUT to the connection Lx2, the voltage comparator circuit 45 outputs a low-level signal so that the third switching device M13 turns ON to conduct.

Next, when the voltage at the connection Lx2 becomes equal to the output voltage Vout so that an indication of generation of reverse current is detected, or when the voltage at the connection Lx2 becomes lower than the output voltage Vout so that generation of reverse current is detected, the voltage comparator circuit 45 latches and outputs a high-level signal, and stops the voltage comparison operation so as to enter a low current consumption mode. Therefore, the third switching device M13 turns OFF to not conduct (to be in an interrupting or cut-off state). At this point, the second switching device M12 remains ON. When a high-level signal is output from the buffer BF1 in order to cause the second switching device M12 to turn OFF to be in a cut-off state, the voltage comparator circuit 45 starts the voltage comparison operation. When the voltage at the connection Lx2 exceeds the output voltage Vout, the voltage comparator circuit 45 releases the latch on the high-level signal, and outputs a low-level signal.

The above-description is given of the case of having the circuit configuration of FIG. 5. The same applies to the case of having the circuit configuration of FIG. 6. In this case, the reverse current detector circuit 6a of FIG. 4 may be replaced by the reverse current detector circuit 6c shown in FIG. 9. Accordingly, a description thereof is omitted.

Thus, according to the switching regulator 1c of the fourth embodiment, the reverse current detector circuit 6c performs the same operations as the reverse current detector circuit 6a of FIG. 5, and when the voltage at the connection Lx2 becomes equal to the output voltage Vout so that an indication of generation of reverse current is detected or when the voltage at the connection Lx1 exceeds ground voltage so that generation of reverse current is detected, the reverse current detector circuit 6c stops a voltage comparison operation so as to enter a low current consumption mode after latching and outputting a signal for causing the third switching device M13 to turn OFF to be in a cut-off state. Therefore, the same effects as in the second embodiment can be produced, and current consumption can be reduced.

Figure 10:
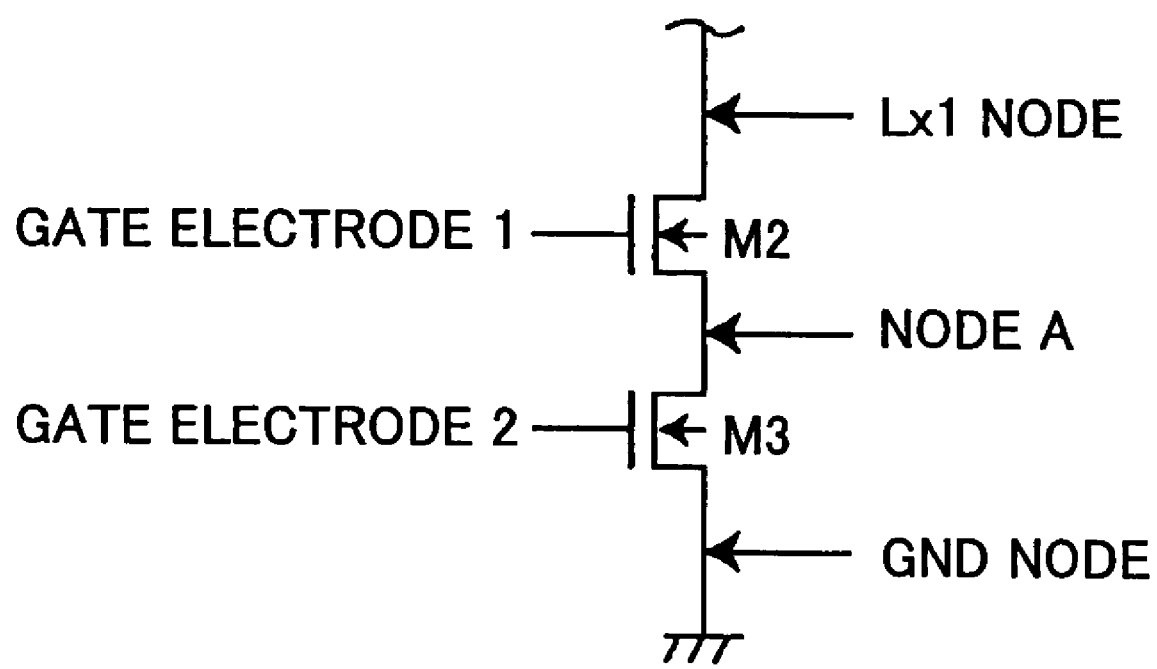
FIG. 10 is a diagram showing a second switching device and a third switching device of FIG. 2 according to the present invention.
Figure 11:
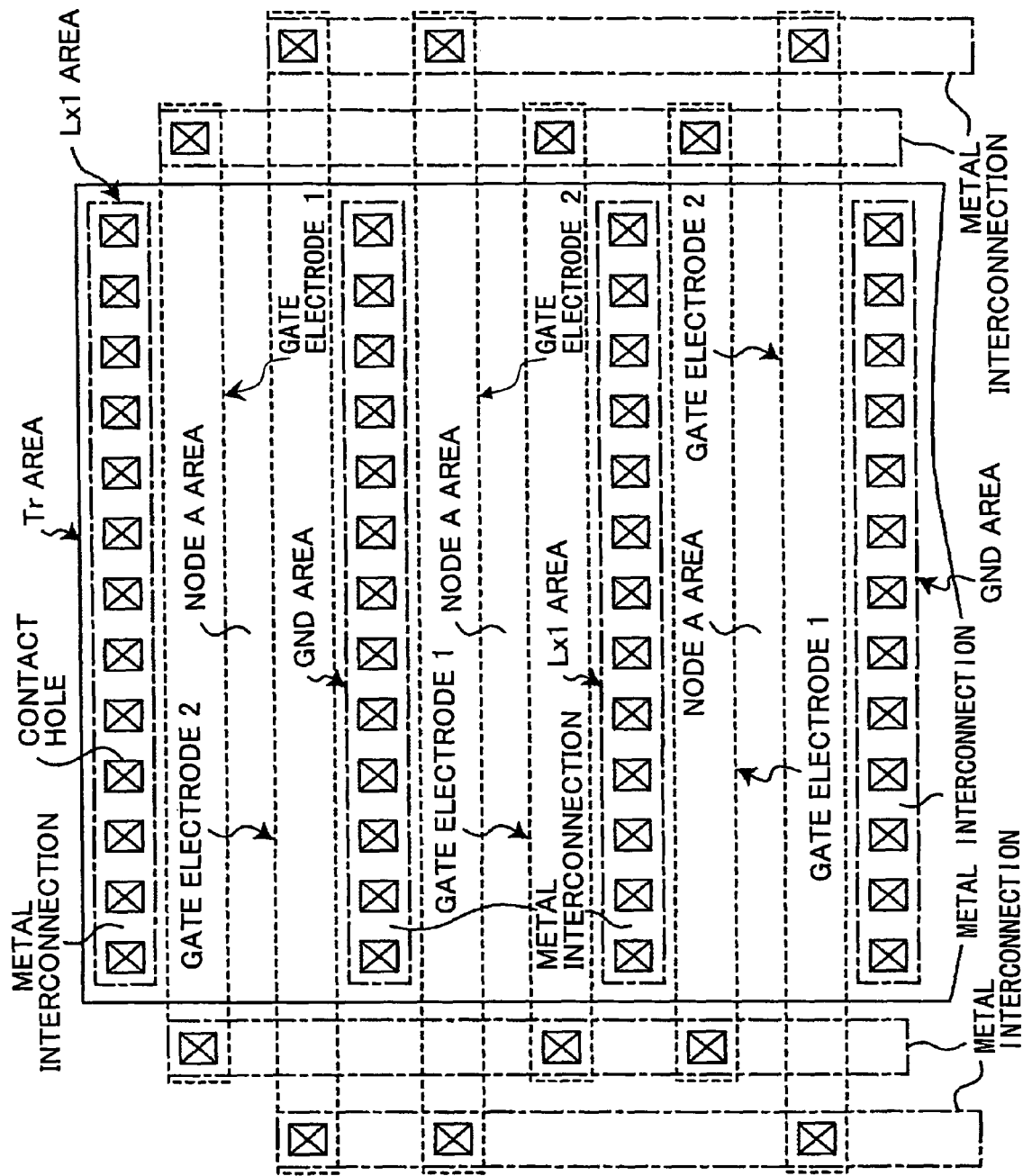
FIG. 11 is a diagram showing a layout pattern in the case of FIG. 10 according to the present invention.

In the above-described first through fourth embodiments, the second and third switching devices are large in size. Therefore, in the case of laying out the second and third switching devices connected in series, it is possible to reduce chip area by causing the drain of one of the two switching devices to also serve as the source of the other one of the two switching devices at the connection thereof. For example, FIG. 10 shows the second and third switching devices M2 and M3 in the case of FIG. 2. FIG. 11 shows a layout pattern of the second and third switching devices M2 and M3 in the case of FIG. 10. In FIG. 11, the source of the second switching device M2 also serves as the drain of the third switching device M3.

According to one embodiment of the present invention, there is provided a switching regulator of a synchronous rectification type converting an input voltage input to an input terminal into a predetermined constant voltage and outputting the predetermined constant voltage to a load connected to an output terminal, the switching regulator including: a first switching element configured to perform switching in accordance with a control signal input thereto; an inductor configured to be charged with the input voltage by the switching of the first switching element; a second switching element for synchronous rectification configured to perform switching in accordance with a control signal input thereto so as to discharge the inductor; a control circuit part configured to control the switching of the first switching element so that an output voltage output from the output terminal is the predetermined constant voltage, and to cause the second switching element to perform the switching inversely to the first switching element; and a reverse current prevention circuit part configured to interrupt a current that flows into the second switching element by cutting off the connection of the second switching element so as to prevent generation of a reverse current that flows in the direction of the second switching element from the output terminal.

According to one embodiment of the present invention, there is provided a control circuit of a switching regulator of a synchronous rectification type, the switching regulator including a first switching element configured to perform switching in accordance with a control signal input thereto; an inductor configured to be charged with an input voltage input to an input terminal of the switching regulator by the switching of the first switching element; and a second switching element for synchronous rectification configured to perform switching in accordance with a control signal input thereto so as to discharge the inductor, wherein the switching of the first switching element is controlled so that an output voltage output from an output terminal of the switching regulator is a predetermined constant voltage, and the second switching element is caused to perform the switching inversely to the first switching element, so that the input voltage input to the input terminal is converted into the predetermined constant voltage and the predetermined constant voltage is output to a load connected to the output terminal, the control circuit including: a control circuit part configured to control the switching of the first switching element so that the output voltage output from the output terminal is the predetermined constant voltage, and to cause the second switching element to perform the switching inversely to the first switching element; and a reverse current prevention circuit part configured to interrupt a current that flows into the second switching element by cutting off the connection of the second switching element so as to prevent generation of a reverse current that flows in the direction of the second switching element from the output terminal.

According to one embodiment of the present invention, there is provided a method of controlling an operation of a switching regulator of a synchronous rectification type, the switching regulator including a first switching element configured to perform switching in accordance with a control signal input thereto; an inductor configured to be charged with an input voltage input to an input terminal of the switching regulator by the switching of the first switching element; and a second switching element for synchronous rectification configured to perform switching in accordance with a control signal input thereto so as to discharge the inductor, wherein the switching of the first switching element is controlled so that an output voltage output from an output terminal of the switching regulator is a predetermined constant voltage, and the second switching element is caused to perform the switching inversely to the first switching element, so that the input voltage input to the input terminal is converted into the predetermined constant voltage and the predetermined constant voltage is output to a load connected to the output terminal, the method including interrupting a current that flows into the second switching element by cutting off the connection of the second switching element so as to prevent generation of a reverse current that flows in the direction of the second switching element from the output terminal.

According to a switching regulator of a synchronous rectification type, a control circuit thereof, and a method of controlling the operation of the switching regulator according to embodiments of the present invention, a current that flows into a switching element for synchronous rectification (second switching device) is interrupted by cutting off the connection of the switching element for synchronous rectification in order to prevent generation of a reverse current that flows in the direction of the switching element for synchronous rectification from an output terminal. Since the reverse current that flows into the switching element for synchronous rectification can be interrupted using a circuit independent of the control circuit system of the switching element for synchronous rectification, it is possible to reduce the delay in time between detection of generation of the reverse current and interruption of the reverse current, thus making it possible to improve efficiency. Further, this also facilitates designing, thus making it possible to perform designing with efficiency.

The present invention is not limited to the specifically disclosed embodiments, and variations and modifications may be made without departing from the scope of the present invention.

The present application is based on Japanese Priority Patent Applications No. 2005-340626, filed on Nov. 25, 2005, and No. 2006-196772, filed on Jul. 19, 2006, the entire contents of which are hereby incorporated by reference.

The invention claimed is:

1. A switching regulator of a synchronous rectification type converting an input voltage input to an input terminal into a predetermined constant voltage and outputting the predetermined constant voltage to a load connected to an output terminal, the switching regulator comprising:
    a first switching element configured to perform switching in accordance with a control signal input thereto;
    an inductor configured to be charged with the input voltage by the switching of the first switching element;
    a second switching element for synchronous rectification configured to perform switching in accordance with a control signal input thereto so as to discharge the inductor;
    a control circuit part configured to control the switching of the first switching element so that an output voltage output from the output terminal is the predetermined constant voltage, and to cause the second switching element to perform the switching inversely to the first switching element; and
    a reverse current prevention circuit part configured to interrupt a current that flows into the second switching element by cutting off a selected connection of the second switching element that is different from a connection for said control signal input to the second switching elements so as to prevent generation of a reverse current that flows in a direction of the second switching element from the output terminal, the reverse current prevention circuit part comprising
    a reverse current detector circuit configured to detect the reverse current, by selectively carrying out a voltage comparison operation to compare (i) voltage at the connection of the first switching element and the inductor and (ii) a ground voltage, and latching and outputting a cut-off signal to interrupt the current that flows into the second switching element by cutting off the selected connection of the second switching element, when the reverse current has been detected,
    wherein said reverse current detector circuit stops the voltage comparison operation when the reverse current has been detected, and resumes the voltage comparison operation when the second switching element turns off.

2. The switching regulator as claimed in claim 1, wherein the reverse current prevention circuit part interrupts the current that flows into the second switching element by cutting off the selected connection of the second switching element upon detecting, from a voltage at a connection of the first switching element and the inductor, one of the generation of the reverse current that flows in the direction of the second switching element from the output terminal and an indication of the generation of the reverse current.

3. The switching regulator as claimed in claim 2, wherein the reverse current prevention circuit part comprises:
    a third switching element connected in series to the second switching element and configured to perform switching in accordance with a control signal input to a control electrode thereof, wherein
    the reverse current detector circuit interrupts the current that flows into the second switching element by causing the third switching element to turn off to be in a cut-off state upon detecting, from the voltage at the connection of the first switching element and the inductor, the one of the generation of the reverse current that flows in the direction of the second switching element from the output terminal and the indication of the generation of the reverse current.

4. The switching regulator as claimed in claim 3, wherein:
    the first switching element performs the switching in accordance with the control signal input to a control electrode thereof so as to perform output control of the input voltage;
    the switching regulator is a step-down type where the inductor is connected between an output of the first switching element and the output terminal and the second switching element is connected between the first switching element and ground; and
    the reverse current detector circuit causes the third switching element to turn off to be in the cut-off state when the voltage at the connection of the first switching element and the inductor is greater than or equal to ground voltage.

5. The switching regulator as claimed in claim 4, wherein the reverse current detector circuit includes a voltage comparator selectively carrying out the voltage comparison operation, and said reverse current detector circuit causes the third switching element to turn off to be in the cut-off state, maintains the cut-off state, and stops the voltage comparison operation when the voltage at the connection of the first switching element and the inductor is greater than or equal to the ground voltage, and resumes the voltage comparison operation when the second switching element turns off to be in a cut-off state.

6. The switching regulator as claimed in claim 5, wherein the first switching element, the second switching element, the control circuit part, and the reverse current prevention circuit part are integrated into a single IC.

7. The switching regulator as claimed in claim 3, wherein:
the switching regulator is a step-up type where the inductor has a first end thereof connected to the input terminal, the first switching element is connected between a second end of the inductor and ground, and the second switching element is connected between the connection of the first switching element and the inductor and the output terminal; and
the reverse current detector circuit causes the third switching element to turn off to be in the cut-off state when the voltage at the connection of the first switching element and the inductor is less than or equal to the output voltage.

8. The switching regulator as claimed in claim 7, wherein the reverse current detector circuit includes a voltage comparator selectively carrying out the voltage comparison operation, and said reverse current detector circuit causes the third switching element to turn off to be in the cut-off state, maintains the cut-off state, and stops the voltage comparison operation when the voltage at the connection of the first switching element and the inductor is less than or equal to the output voltage, and resumes the voltage comparison operation when the second switching element turns off to be in a cut-off state.

9. The switching regulator as claimed in claim 8, wherein the first switching element, the second switching element, the control circuit part, and the reverse current prevention circuit part are integrated into a single IC.

10. The switching regulator as claimed in claim 3, wherein the control circuit part and the reverse current detector circuit are integrated into a single IC.

11. The switching regulator as claimed in claim 1, wherein the first switching element, the second switching element, the control circuit part, and the reverse current prevention circuit part are integrated into a single IC.

12. A control circuit of a switching regulator of a synchronous rectification type, the switching regulator including a first switching element configured to perform switching in accordance with a control signal input thereto; an inductor configured to be charged with an input voltage input to an input terminal of the switching regulator by the switching of the first switching element; and a second switching element for synchronous rectification configured to perform switching in accordance with a control signal input thereto so as to discharge the inductor, wherein the switching of the first switching element is controlled so that an output voltage output from an output terminal of the switching regulator is a predetermined constant voltage, and the second switching element is caused to perform the switching inversely to the first switching element, so that the input voltage input to the input terminal is converted into the predetermined constant voltage and the predetermined constant voltage is output to a load connected to the output terminal, the control circuit comprising:
a control circuit part configured to control the switching of the first switching element so that the output voltage output from the output terminal is the predetermined constant voltage, and to cause the second switching element to perform the switching inversely to the first switching element; and
a reverse current prevention circuit part configured to interrupt a current that flows into the second switching element by cutting off a selected connection of the second switching element that is different from the connection for the control signal input to the second switching element so as to prevent generation of a reverse current that flows in a direction of the second switching element from the output terminal, the reverse current prevention circuit part comprising
a reverse current detector circuit configured to detect the reverse current, by selectively carrying out a voltage comparison operation to compare (i) voltage at the connection of the first switching element and the inductor and (ii) a ground voltage, and latching and outputting a cut-off signal to interrupt the current that flows into the second switching element by cutting off the selected connection of the second switching element, when the reverse current has been detected,
wherein said reverse current detector circuit stops the voltage comparison operation when the reverse current has been detected, and resumes the voltage comparison operation when the second switching element turns off.

13. The control circuit as claimed in claim 12, wherein the reverse current prevention circuit part interrupts the current that flows into the second switching element by cutting off the selected connection of the second switching element upon detecting, from a voltage at a connection of the first switching element and the inductor, one of the generation of the reverse current that flows in the direction of the second switching element from the output terminal and an indication of the generation of the reverse current.

14. The control circuit as claimed in claim 13, wherein the reverse current prevention circuit part comprises:
a third switching element connected in series to the second switching element and configured to perform switching in accordance with a control signal input to a control electrode thereof, wherein
the reverse current detector circuit interrupts the current that flows into the second switching element by causing the third switching element to turn off to be in a cut-off state upon detecting, from the voltage at the connection of the first switching element and the inductor, the one of the generation of the reverse current that flows in the direction of the second switching element from the output terminal and the indication of the generation of the reverse current.

15. The control circuit as claimed in claim 14, wherein the reverse current detector circuit includes a voltage comparator selectively carrying out the voltage comparison operation, and said reverse current detector circuit causes the third switching element to turn off to be in the cut-off slate, maintains the cut-off state, and stops the voltage comparison operation when the voltage at the connection of the first switching element and the inductor is greater than or equal to the ground voltage, and resumes the voltage comparison operation when the second switching element turns off to be in a cut-off state.

16. The control circuit as claimed in claim 14, wherein the reverse current detector circuit includes a voltage comparator selectively carrying out the voltage comparison operation, and said reverse current detector circuit causes the third switching element to turn off to be in the cut-off state, maintains the cut-off state, and stops the voltage comparison operation when the voltage at the connection of the first switching element and the inductor is less than or equal to the output voltage, and resumes the voltage comparison operation when the second switching element turns off to be in a cut-off state.

17. A method of controlling an operation of a switching regulator of a synchronous rectification type, the switching regulator including a first switching element configured to perform switching in accordance with a control signal input thereto; an inductor configured to be charged with an input voltage input to an input terminal of the switching regulator by the switching of the first switching element; a second switching element for synchronous rectification configured to perform switching in accordance with a control signal input thereto so as to discharge the inductor, and a reverse current detector circuit configured to detect a reverse current that flows in a direction of the second switching element from an output terminal of the switching regulator, wherein the switching of the first switching element is controlled so that an output voltage output from the output terminal of the switching regulator is a predetermined constant voltage, and the second switching element is caused to perform the switching inversely to the first switching element, so that the input voltage input to the input terminal is converted into the predetermined constant voltage and the predetermined constant voltage is output to a load connected to the output terminal, the method comprising:

detecting, by the reverse current detector circuit, the reverse current, including
    selectively carrying out a voltage comparison operation to compare (i) voltage at the connection of the first switching element and the inductor and (ii) a ground voltage,
    latching and outputting a cut-off signal, when the reverse current has been detected, to interrupt the current that flows into the second switching element by cutting off the selected connection of the second switching element, and stopping the voltage comparison operation, and
    resuming the voltage comparison operation when the second switching element turns off; and
  interrupting a current that flows into the second switching element by cutting off a selected connection of the second switching element that is different from a connection thereto for inputting said control signal thereto so as to prevent generation of the reverse current that flows in the direction of the second switching element from the output terminal.

18. The method as claimed in claim 17, wherein the current that flows into the second switching element is interrupted by cutting off the selected connection of the second switching element when one of the generation of the reverse current that flows in the direction of the second switching element from the output terminal and an indication of the generation of the reverse current is detected from a voltage at a connection of the first switching element and the inductor.

19. The method as claimed in claim 18, wherein:
  the switching regulator further includes a third switching element connected in series to the second switching element and configured to perform switching in accordance with a control signal input to a control electrode thereof; and
  the current that flows into the second switching element is interrupted by causing the third switching element to turn off to be in a cut-off state when the one of the generation of the reverse current that flows in the direction of the second switching element from the output terminal and the indication of the generation of the reverse current is detected from the voltage at the connection of the first switching element and the inductor.

20. The method as claimed in claim 19, wherein when the switching regulator is a step-down type and includes a voltage comparator selectively carrying out the voltage comparison operation, and the third switching element is caused to turn off to be in the cut-off state, the cut-off state is maintained, and the voltage comparison operation is stopped when the voltage at the connection of the first switching element and the inductor is greater than or equal to the ground voltage, and the voltage comparison operation is resumed when the second switching element turns off to be in a cut-off state.

21. The method as claimed in claim 19, wherein when the switching regulator is a step-up type and includes a voltage comparator selectively carrying out the voltage comparison operation, and the third switching element is caused to turn off to be in the cut-off state, the cut-off state is maintained, and the voltage comparison operation is stopped when the voltage at the connection of the first switching element and the inductor is less than or equal to the output voltage, and the voltage comparison operation is resumed when the second switching element turns off to be in a cut-off state.

22. A switching regulator of a synchronous rectification type converting an input voltage input to an input terminal into a predetermined constant voltage and outputting the predetermined constant voltage to a load connected to an output terminal, the switching regulator comprising:
  a first switching transistor having first and second main terminals and a control terminal, and a second switching transistor having first and second main terminals and a control terminal, wherein the first switching transistors receives an input voltage at its first main terminal and has its second main terminal connected to a node to which the first main terminal of the second switching transistor is connected;
  a first control circuit coupled with the control terminals of the first and second switching transistors, said first control circuit switching the first and second switching transistors between ON and OFF states for synchronous rectification to supply current to a load through said node;
  an inductor connected to said node;
  a third transistor having a first and second main terminals and a control terminal, said third transistor having its first main terminal connected to said node and its second main terminal connected to one of ground and the load; and
  a current reversal detector comprising a voltage comparator receiving, and selectively carrying out a voltage comparison operation to compare, inputs from said node and one of the load and ground and having an output connected to the control terminal of the third transistor, a cut-off signal is latched and supplied through the output to turn OFF the third transistor and thus interrupt a connection of the second terminal of the second switching transistor to one of ground and the load when the comparing indicates onset or presence of reverse current flow from the load through the second switching transistor and thereby prevent or reduce reverse current flow,
  wherein said current reversal detector stops the voltage comparison operation when the reverse current is detected, and resumes the voltage comparison operation when the second switchinig element turns off.

23. A switching regulator as in claim 22 in which said current reversal detector includes a latch circuit stopping said comparing in the presence of said onset or presence of reverse current flow and thereby reducing power consumption.

24. A switching regulator as in claim 22 in which said first, second and third transistors are connected in series between a source of said input voltage and ground.

25. A switching regulator as in claim 22 in which said inductor is connected between said node and said load.

26. A switching regulator as in claim 22 in which said inductor is connected between a source of said input voltage and said node.

27. A switching regulator as in claim 22 in which said current reversal detector turns the third transistor OFF when the voltage at the node is greater than or equal to ground voltage.

28. A switching regulator as in claim 22 in which said current reversal detector turns the third transistor OFF when the voltage at the node is less than or equal to the voltage at the second terminal of the third transistor.

* * * * *